Jan. 9, 1968   R. D. MEDFORD ET AL   3,362,434
FLEXIBLE AXIALLY COMPRESSIBLE HOSE
Filed Sept. 16, 1964   2 Sheets-Sheet 1
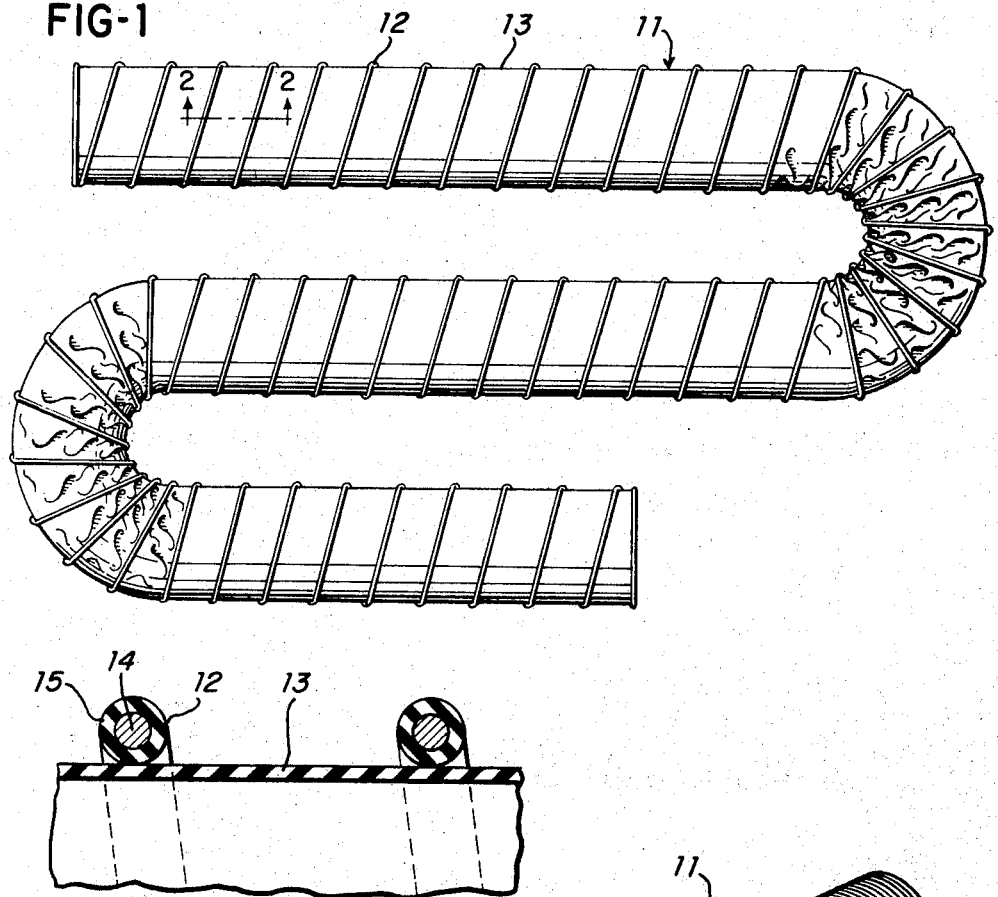
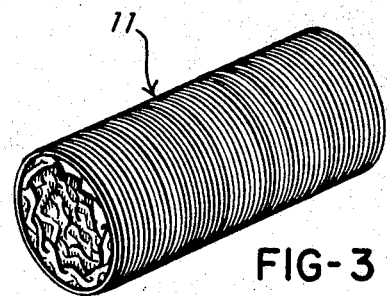
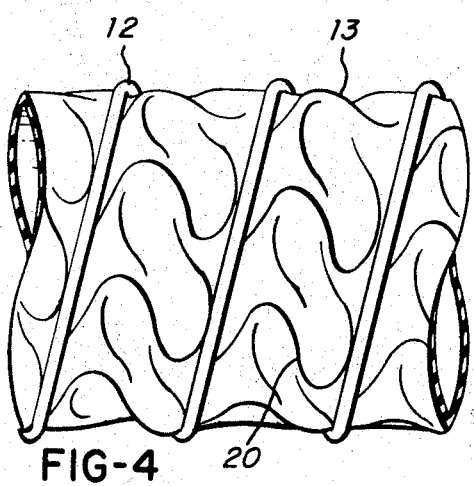
INVENTORS
RICHARD D. MEDFORD
CARROLL H. OSBORN
LINCOLN I. OPPER

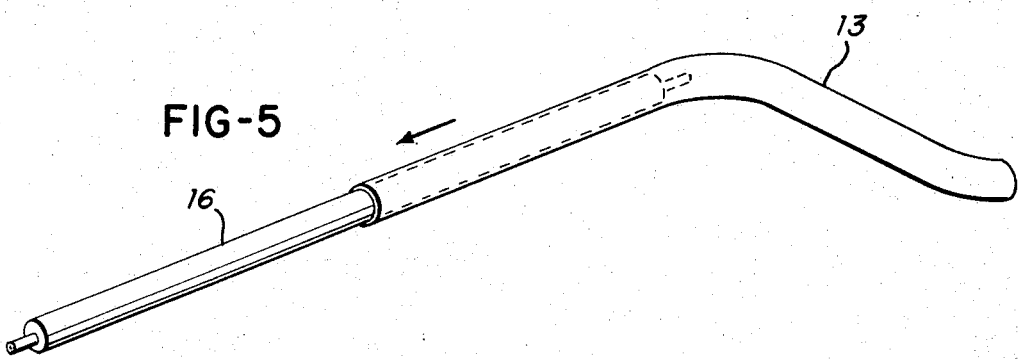
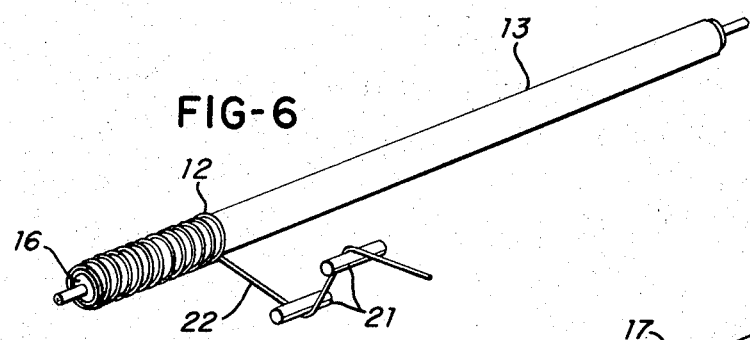
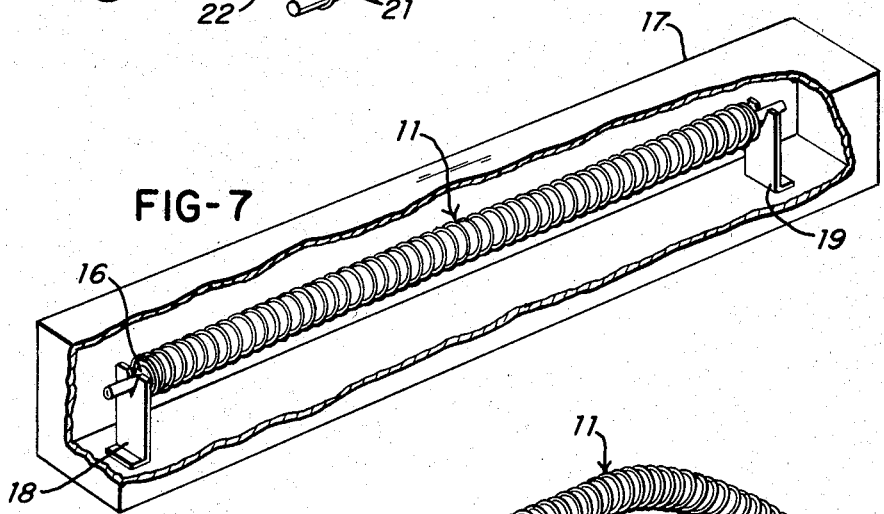
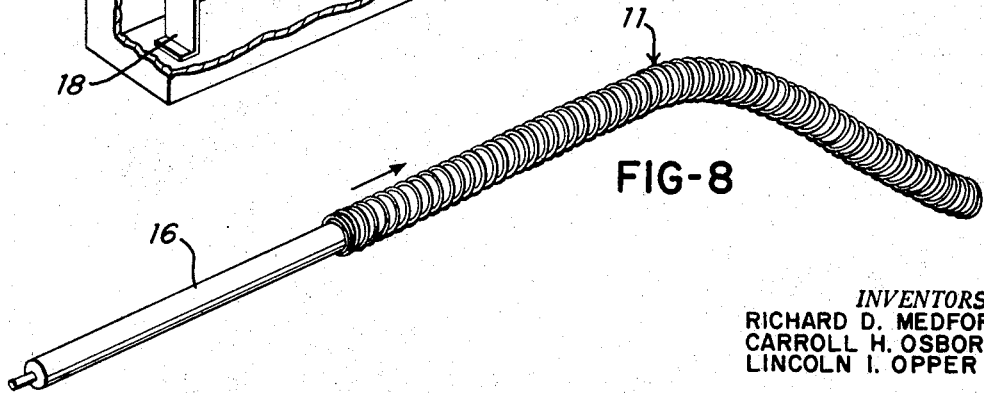
INVENTORS
RICHARD D. MEDFORD
CARROLL H. OSBORN
LINCOLN I. OPPER

United States Patent Office 3,362,434
Patented Jan. 9, 1968

3,362,434
FLEXIBLE AXIALLY COMPRESSIBLE HOSE
Richard D. Medford and Carroll H. Osborn, Waynesville, N.C., and Lincoln I. Opper, Dayton, Ohio, assignors to Dayco Corporation, a corporation of Delaware
Filed Sept. 16, 1964, Ser. No. 396,855
2 Claims. (Cl. 138—122)

This invention relates to flexible hose and method of manufacturing same. More particularly, it relates to a hose which is highly flexible and capable of axial compression for storage purposes, and yet is useful for the transfer of fluids such as air when used in hair dryers and the like.

It has been well known in the prior art to utilize a flexible hose of the type which consists of a helical reinforcing coil having axially spaced turns, surmounted by a thin lightweight plastic tube. Such a conduit, which has great utility in fluid transfer, is described for example in United States Patents Nos. 2,949,133 and 3,006,381, of common assignment. The construction of such prior art hose provides for internal reinforcing to avoid collapse and permits a high degree of flexibility with a limited amount of compressibility. In most cases, however, there has been no particular need to compress such prior art hose as their use in vacuum cleaners and the like is of such nature that compressibility is not a factor.

It has also been found desirable in some instances to provide a hose which is extensible in nature, such as described in United States Patents Nos. 2,739,616 and 2,783,819. Such a conduit combines flexibility and extensibility and achieves this by having the tubular member either exteriorly or interiorly of the helical coil. In either case, the hose at rest will tend to have its coils close together, yet separated by a double thickness of the tubular member which extends between the turns. This hose is so constructed that it cannot be compressed any further.

The present invention relates to an entirely different novel concept wherein the primary consideration of the hose is to create a highly compressible hose in an axial direction for storage purposes; yet a hose which when fully extended is sufficiently strong to carry the fluid and provide a smooth flow. Such a hose has great utility for example in a hair dryer in which the hose must be extended during its use when hot air is blown through it, yet compressible to an absolute minimum when the hose is stored and the dryer is not in use. This is achieved by placing a helical reinforcing coil having axially spaced turns externally of a very thin tube so that in its normal or static condition the hose is fully extended and the inner surface of the tube is smooth and has a constant diameter for maximum flow. The reinforcing coil under such conditions is at rest and must be compressed to create the stored position of the hose. Releasing this compressed condition will permit the hose to then be automatically restored to its extended position for use in conducting air. A highly important aspect of this compressibility lies in the fact that the hose may be axially compressed into an amazingly short length.

The novel result is achieved by the use of a very small diameter wire for a very thin wall tube, which enhances this compressibility. The use of proper wire spacing also is important as it is necessary to permit the walls of the tube upon compression to achieve slack folds which extend inwardly of the hose.

The novel concept of the use of the reinforcing coil that has turns which are spaced apart in a static condition is largely responsible for the results obtained. While in the prior art it has been known to utilize a coil on the exterior of a hose, such coils are usually locked to the surface of the tube in a compressed position as described for example in United States Patents Nos. 2,894,536 and 2,524,679, as well as in the aforementioned Patent No. 2,739,616. This provides an entirely different concept, however, because the close relationship of the coils actually prevents the extremely great compression which is possible in the present invention.

It is accordingly a principal object of the present invention to provide an axially compressible hose.

It is a further object of the invention to provide such a hose which is light in weight, flexible, and yet suitably reinforced to permit flow of fluids.

It is a further object of the invention to provide such a hose having a smooth inner surface to permit the flow of air and eliminate the collection of dirt on the interior surface.

It is a further object of the invention to provide a hose which is capable of compression so that the adjacent turns of the reinforcing coil are in contact.

These and other objects of the invention will be apparent from the following specification and examination of the drawings, in which:

FIGURE 1 is an elevational view of a hose manufactured in accordance with the present invention.

FIGURE 2 is an enlarged sectional view of a portion of the novel hose, taken along lines 2—2 of FIGURE 1.

FIGURE 3 is a perspective view of the hose of FIGURE 1 in a compressed position.

FIGURE 4 is an elevational view of a portion of the hose in a partially axially compressed position.

FIGURE 5 is a perspective view illustrating a first step of one method of constructing the novel hose.

FIGURES 6, 7 and 8 are perspective views illustrating further steps in the construction of the hose.

Turning now to the drawings, FIGURE 1 illustrates a typical embodiment of a hose 11 in accordance with the present invention, shown in a fully extended position which it will assume during the flow of air through the hose. The hose consists of a thin plastic tube 13 surmounted by the helical reinforcing coil 12 which has axially spaced turns extending throughout the length of the hose. This coil provides reinforcement for the hose so that it maintains its shape under normal operation, such as the use of the hose in hair dryers. As is further shown in FIGURE 2, the interior of the hose in this extended position is completely smooth and maintained at a constant diameter by the reinforcing coil, thereby permitting the flow of air throughout the hose with a minimum of turbulence. The tube 13 is made of a thermoplastic resin such as polyvinyl chloride, polyethylene, vinyl chloride-acetate; urethane elastomer; synthetic or natural rubber; or similar materials. The material may be compounded such as described in the above-mentioned Patent No. 3,006,381, and subsequently extruded into a continuous tube in a well-known manner. Alternatively, the tube rather than being extruded might be formed of strips which are overlapped and bonded in an edge to edge or in an overlapping relationship to form a continuous member. In any case, the term "tube" as used throughout this application refers to the continuous tubular member regardless of the method of formation. The reinforcing coil 12 consists of a circular cross section wire 14 covered by a coating 15 of material similar to that of the tube. This coil is formed into a continuous helical member having spaced turns so that the coils are at a static condition when spaced as shown.

The tube should be comparatively thin in order to provide extremely high flexibility and is usually in the neighborhood of .005 to .015 inch thick, with the optimum being approximately .010 inch. The wire is preferably between .010 and .020 inch in diameter with the optimum being .015 inch; the coating is normally about .010 inch thick which therefore provides a coated wire in the range of .030 to .040 inch, having an optimum of .035 inch in diameter. The turns of the coil are spaced at approximately ¾ inch, while the diameter of the hose is 1¾ inches, thus providing a ratio between the diameter and the spacing of approximately 7:3. The wire diameter should not be smaller than the range indicated as it will produce a flimsy hose, and should not exceed the maximum indicated as this will create wrinkles in the tube. The extended hose shown in FIGURES 1 and 2 may be successfully compressed in an axial direction from its static length of about 40 inches to about 2 inches as shown in FIGURE 3; thus it may be said to be axially compressible to $1/20$ of its static length. The remarkable compressibility of the hose is best illustrated by the extended end compressed positions contrasted in FIGURES 1 and 3. In the compressed position the tube assumes folds which are forced inwardly of the hose, permitting each of the turns to contact the adjacent turns in order to maintain the maximum compressibility. The compressed hose, therefore, is equal in length to the total of the diameters of the turns of the coil. The slack folds of the tube take place along a series of fold lines 20 which extend at an angle to the turns as shown in FIGURE 4.

The hose may be manufactured in a very simple and efficient manner. As shown in FIGURE 5, the tube 13 is slipped on a cylindrical mandrel 16 by forcing enough air inside the tube to enable it to slide over the mandrel, which is a well-known expedient in the hose making art. The next step in the construction is shown in FIGURE 6 in which the wire 22 is passed over a festooning system represented by the rollers 21. The passage of this wire over the festooning system and onto the mandrel will form it into the helical coil 12 in which the turns achieve the spacing as shown. When the reinforcing coil has been completely placed upon the tube the entire assembly, including the mandrel, is removed and placed into a hot air oven 17 and the ends of the mandrel mounted on the supports 18 and 19. The oven is heated to a temperature sufficiently high to permit the inner surface of the coil to melt and flow onto the outer surface of the tube sufficiently to create a permanent bond. The exact temperature and time of heating will, of course, depend upon the material which is being used. When curing has been completed the assembly is removed from the oven, and the finished hose 11 is stripped from the mandrel, as shown in FIGURE 8. The resultant product is a hose having lightness and flexibility and capable of a very high degree of axial compression for storage purposes.

While the foregoing invention has been described in connection with certain preferred embodiments, it will be understood that the specific details have been for purposes of illustration only and are not intended to limit the scope of the invention as defined in the following claims. For example, the diameter and spacing of the wire, diameter of the hose, and the compressibility of the hose may be varied over a wide range in accordance with the end use of the product.

We claim:
1. A flexible axially compressible hose comprising a tube surmounted by a helical reinforcing coil having axially spaced turns, the diameter of said coil having a ratio to the spacing of said turns of approximately 7:3, each of said turns in substantial contact with its adjacent turns, and said tube being in the form of slack folds at an angle between turns, when said hose is fully axially compressed.

2. The hose of claim 1 in which said hose is axially compressible to approximately $1/20$ of its length in normal static condition.

References Cited
UNITED STATES PATENTS
| | | | |
|---|---|---|---|
| 2,340,794 | 2/1944 | Chernack | 138—134 |
| 2,739,616 | 3/1956 | Duff | 138—133 X |

FOREIGN PATENTS
| | | |
|---|---|---|
| 216,606 | 11/1909 | Germany. |
| 1,001,222 | 1/1957 | Germany. |
| 1,064,457 | 9/1959 | Germany. |
| 775,639 | 5/1957 | Great Britain. |

LAVERNE D. GEIGER, *Primary Examiner.*

C. L. HOUCK, *Assistant Examiner.*